Aug. 16, 1966　　　M. A. SCHAFFER　　　3,266,325
GYROSCOPIC APPARATUS

Filed Feb. 26, 1963　　　　　　　　　　　　　4 Sheets-Sheet 4

INVENTOR.
MAX A. SCHAFFER
BY
ATTORNEY

United States Patent Office 3,266,325
Patented August 16, 1966

---

3,266,325
GYROSCOPIC APPARATUS
Max A. Schaffer, Williston Park, N.Y., assignor to Sperry Rand Corporation, Great Neck, N.Y., a corporation of Delaware
Filed Feb. 26, 1963, Ser. No. 261,005
11 Claims. (Cl. 74—5.34)

This invention relates to gyroscopic apparatus and particularly to the type known as gyroscopic stable platforms.

The requirement for increased navigational accuracy, particularly for military aircraft and missiles, has brought about the development of very accurate inertial stable platforms. Presently, very accurate stable platforms of this type utilize floated inertial elements. Floated inertial elements are extremely expensive, difficult to manufacture, and have in turn introduced new maintenance and reliability problems. Further, due to the fact that the inertial elements are floated, the flotation fluid must be continually maintained within a predetermined temperature range for proper operation, and if not maintained within this temperature range, the initial warm-up time is prohibitive particularly for certain military applications. Another disadvantage of the prior art inertial stable platforms is that they are unduly large, heavy and complex.

It is therefore a primary object of the present invention to provide a gyroscopic stable reference apparatus that is accurate, reliable and relatively easy to maintain.

It is a further object of the present invention to provide a gyroscopic stable reference apparatus which utilizes non-floated inertial elements thereby eliminating the problems associated with flotation while providing substantially the same accuracy.

It is another object of the present invention to provide an accurate and reliable gyroscopic stable reference apparatus that is small in size, light in weight, and relatively easy to manufacture and maintain.

The above and other objects are accomplished by means of the present invention which in a preferred embodiment utilizes a two degree of freedom vertical gyroscope and a single degree of freedom gyroscope mounted within a common pitch stabilized gimbal. The pitch stabilized gimbal in turn is pivotably mounted within a roll stabilized gimbal that is pivotably mounted for rotation about the roll axis of the craft. In the preferred embodiment, the single degree of freedom gyroscope is mounted on an azimuth stabilized element that is pivotably rotated on said pitch gimbal thereby providing a virtual second degree of freedom to the single degree of freedom gyroscope in order that it provides directional gyroscope information. First and second acceleration responsive devices are mounted on the azimuth stabilized element to provide signal representative of the tilt of said element to stabilize the roll and pitch gimbals. By utilizing the principles described in U.S. Patent 2,970,480 in conjunction with the preferred embodiment described briefly above, accuracy equivalent to inertial gyro performance has been attained without flotation of the gyro. Further, utilizing a large annular bearing provides access through the bearing opening to the components of the stable reference apparatus for ease of maintenance. This feature also permits the apparatus to be made more compact since the opening in the annular bearing is made large enough to permit a portion of the stable reference apparatus to swing through the opening during operation. The stable reference apparatus has been made more compact in another direction by mounting the vertical gyroscope with its pitch gimbal journalled inboard rather than outboard.

Referring to the drawings.

Figure 1:
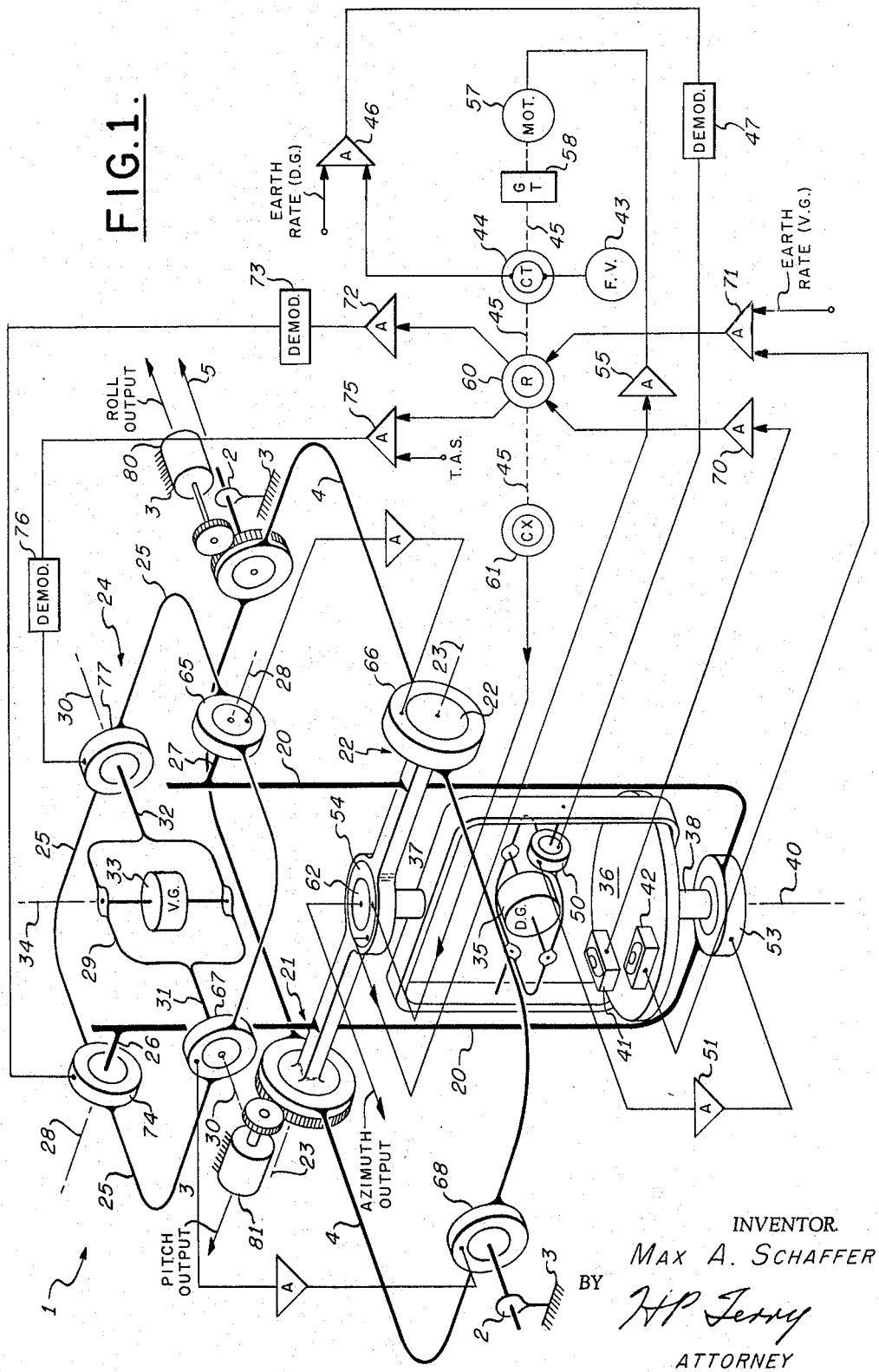
FIG. 1 is a schematic perspective of a gyroscopic stable reference apparatus constructed in accordance with the present invention.

Referring to the drawings, and particularly FIG. 1, a gyro stable platform 1 is mounted for movement within a housing 2 that is fixed with respect to an airframe 3, for example. The outer roll gimbal 4 of the stable platform 1 is mounted to pivot around an axis 5 that is coincident with the fore-and-aft axis of the aircraft about which the aircraft rolls. The outer roll gimbal 4 is mounted to pivot around the axis 5 by means of large spaced annular bearings 10 and 11, shown in FIGS. 2 and 3 in order to simplify FIG. 1, which have their inner races 12 and 13 connected to respective extremities of the outer roll gimbal 4. The respective outer races 15 and 16 of the spaced bearings 10 and 11 are mounted within the housing 2 by means of respective circumferentially spaced shock mounts 17 and 18. The large roll bearings 10 and 11 permit full freedom in pitch while maintaining a minimum dimension in the direction of the axis 5 in a manner to be more fully explained. An outer pitch gimbal 20 of the stable platform 1 is rotatably mounted on the outer roll gimbal 4 by means of spaced trunnions 21 and 22 to pivot about an axis 23 that is perpendicular to the axis 5. The axis 23 is normally parallel with the athwartship axis of the craft about which the craft pitches.

A two degree of freedom vertical gyroscope 24 has its outer gimbal 25 rotatably mounted to pivot on the outer pitch gimbal 20 by means of spaced trunnions 26 and 27 around an axis 28 that is parallel to the axis 23. To conserve space, the trunnions 26 and 27 are disposed inboard of the gimbal 25. The inner gimbal 29 of the vertical gyroscope 24 is in turn rotatably mounted upon the outer gimbal 25 to pivot about an axis 30 that is normally parallel to the axis 5 by means of spaced trunnions 31 and 32. The vertical gyro 24 has a rotor 33 which spins about a normally vertical axis 34 within the gimbal 29.

To provide azimuthal reference information, a second gyroscope 35 having directional characteristics is mounted on a portion of the outer pitch gimbal 20 extending on the other side of the axis 23. Preferably, the second gyroscope 35 is a single degree of freedom gyroscope mounted on a platform 36 that is journalled on the outer pitch gimbal 20 by means of spaced trunnions 37 and 38. The platform 36 is stabilized in azimuth in a manner to be explained about an axis 40 that is normally coincident with or parallel to the axis 34. By mounting the gyroscope 35 on the platform 36 which is also stabilized in pitch and roll in a manner to be explained, the gyroscope 35 may be a single degree of freedom type which by virtue of its disposition provides azimuthal information comparable to a two degree of freedom directional gyroscope. An acceleration responsive device in the form of a liquid level 41 that is responsive to accelerations in the north-south direction and to tilt of the platform 36 is also mounted on the platform 36. Another similar liquid level 42 is mounted on the platform 36 to be responsive to accelerations in the east-west direction and to tilt.

It will be appreciated that a two degree of freedom directional gyroscope may be directly mounted on the outer pitch gimbal 20 in lieu of the single degree of freedom gyroscope 35 mounted on the platform 36 to provide an azimuth reference. In that event, the liquid levels 41 and 42 may be mounted on the vertical gimbal of the two degree of freedom directional gyroscope to be responsive to tilt and accelerations in the north-south and east-west directions respectively. With the embodiment shown in FIG. 1, it is not necessary to use a two degree of freedom directional gyroscope since the single degree of freedom gyroscope 35 mounted as shown in stabilized roll and pitch gimbals 4 and 20 respectively maintains the outer pitch gimbal 20 vertical even during maneuvers, thus permitting the use of a low drift single degree of freedom gyro 35 in lieu of a more expensive and complex two degree of freedom gyro.

The operation of the system will be described with regard to a slaved gyro mode of azimuth operation in which a flux valve 43 provides an electrical signal representative of the magnetic heading of the craft. The flux valve 43 is connected to a control transformer 44 and provides the electrical heading signal to the stator thereof while the rotor of the control transformer 44 is connected to an azimuth servo shaft 45 for rotation therewith. An electrical signal representative of the difference between the relative positions of the rotor and stator of the control transformer 44 is amplified in an amplifier 46, demodulated in a demodulator 47 and then transmitted to the torquer portion of a combined pick-off and torquer 50 of the azimuth gyro 35. The combined pick-off and torquer 50 may be of the type shown in U.S. application Ser. No. 32,780, entitled "Electromagnetic Transducer Device," invented by Robert H. Bolton, filed on May 31, 1960, and issued May 7, 1963 as U.S. Patent No. 3,089,044. A correction signal representative of the earth's rate is connected to one input terminal of the algebraic summing amplifier 46 in order to correct for the effects of the earth's rotational rate on the gyroscope 35. The gyroscope 35 precesses in azimuth in response to the torquing action of the pick-off and torquer 50. The precession provides a signal from a control transformer 54 which is responsive to the azimuthal position of the platform 36. The signal from the control transformer 54 is amplified in an amplifier 55 and energizes a servomotor 57 to drive the azimuth servo shaft 45 through a gear train 58 to a position which causes the signal from the control transformer 44 to go to zero. The slaved azimuth gyro system therefore operates in a manner similar to that described in U.S. Patent 2,808,656, entitled "Gyromagnetic Reference Systems," issued to A. D. Perone on October 8, 1957.

Rotation of the azimuth servo shaft 45 also causes rotation of the rotor portion of a resolver 60 and the rotor of a synchro transmitter 61 which are both connected thereto. The resolver 60 may be of the type disclosed in U.S. Patent 2,591,697, of Hays, entitled "Stable Reference Apparatus," issued April 8, 1952. A synchro transmitter 61 is connected to provide an azimuthal signal to the control transformer 54 and also may be connected to transmit heading signals to the aircraft control or weapons systems. A synchro transmitter 62 may also have its rotor positioned in accordance with the azimuthal position of the platform 36 while its stator is mounted on the pitch gimbal 20 in order that its stator provides an azimuthal signal to the aircraft control or weapons systems. The slaved azimuth gyro system therefore operates in a manner similar to that described in said U.S. Patent 2,808,656. The spin axis of the azimuth gyro 35 is maintained level by means of the signal from the pick-off portion of the pick-off torquer 50 which is amplified in an amplifier 51 before it is connected to energize a torque motor 53. The action of the torque motor 53 tending to rotate the platform 36 in azimuth causes the spin axis of the azimuth gyro 35 to return to a level condition thereby eliminating the pick-off signal.

The vertical gyro 24 has a pick-off 65 associated with its outer gimbal 25 which provides a signal representative of the pitch of the aircraft to a pitch torque motor 66 mounted to drive the pitch gimbal 20 in order to maintain it vertical, i.e. stabilized in spite of maneuvers of the craft or tilt. A roll pick-off 67 associated with the gimbal 29 provides a signal representative of the roll of the craft to a roll torque motor 68 mounted to drive the roll gimbal 4 to maintain it horizontal or stabilized in spite of maneuvers of the craft.

A liquid level 41 is mounted on the platform 36 in order that it will sense horizontal accelerations, for example, in the east-west direction and tilt of the platform about a north-south axis. The signal from the liquid level 41 is amplified in an amplifier 70 and applied to one input terminal of the resolver 60. The liquid level 42 is oriented on the platform 36 in order that it will sense horizontal accelerations in a north-south direction and tilt of the platform 36 about an east-west axis. The liquid level 42 is connected to an input terminal of a summing amplifier 71 which in turn is connected to another input terminal of the resolver 60. In order to transpose the signals from the liquid levels 41 and 42 from earth coordinates to aircraft coordinates, the liquid level signals are resolved in the resolver 60 in terms of the heading of the aircraft in a manner similar to that explained in the aforementioned Patent 2,591,697. A correction signal representative of the earth's rate is connected to another input terminal of the algebraic summing amplifier 71 in order to correct for the effects of the earth's rotational rate on the liquid level 42.

One output terminal of the resolver 60 is connected through an amplifier 72 and a demodulator 73 to a pitch torquer 74 for applying a torque to the gimbal 25. The other output terminal of the resolver 60 is connected through a summing amplifier 75 and a demodulator 76 to the roll torquer 77 for applying a torque to the gimbal 29. A signal representative of the true air speed of the craft (TAS as indicated by the legend in FIG. 1) is connected to an input terminal of the algebraic summing amplifier 75 to correct for the effect of the craft's velocity effectively in the northerly and easterly directions on the liquid levels 41 and 42 respectively in order that the signals from the liquid levels 41 and 42 are representative of tilt only neglecting the effects of aircraft acceleration since aircraft acceleration effects are compensated for or reduced in a conventional manner known in the art which is not shown for purposes of simplicity. The resulting precession of the vertical gyro 24 caused by the signals from the resolver 60 provides error signals from pitch and roll pick-offs 65 and 67, respectively, which are mounted to be responsive to the pitch and roll movements respectively of the vertical gyro 24. The pitch and roll signals are connected to energize pitch and roll torque motors 66 and 68, respectively, for driving the pitch and roll gimbals 20 and 4, respectively, to position the platform 36 in order that the outputs from the liquid levels 41 and 42 go to zero.

A synchro transmitter 80 has its rotor positioned in accordance with the movement of the roll gimbal 4 and provides a signal representative of the roll of the aircraft to the aircraft flight control or weapons systems. A synchro transmitter 81 has its rotor connected to be positioned in accordance with the movement of the pitch gimbal 20 and provides a signal representative of the pitch of the craft to the aircraft flight control or weapon systems.

Figure 3:
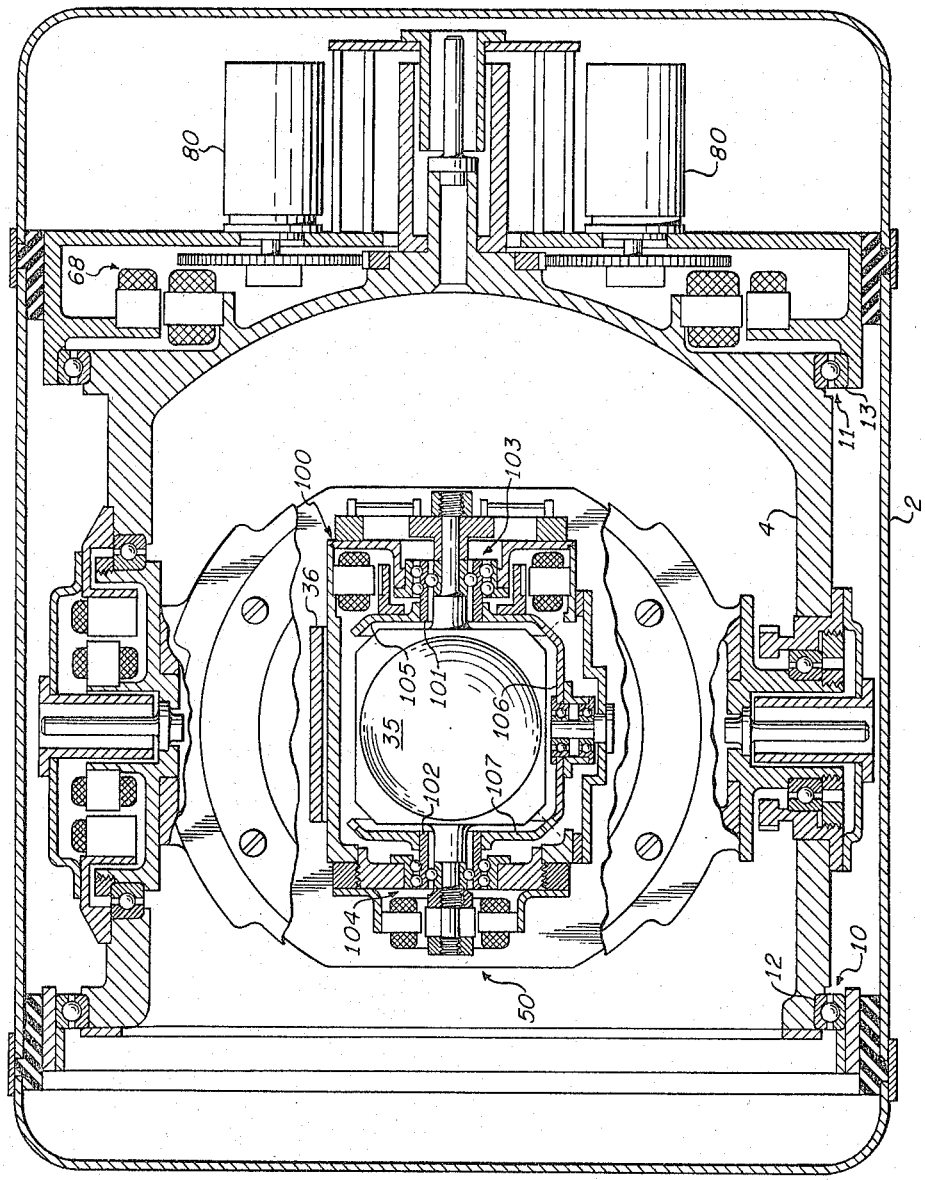
FIG. 3 is a bottom view of the apparatus of FIG. 2.
Figure 4:
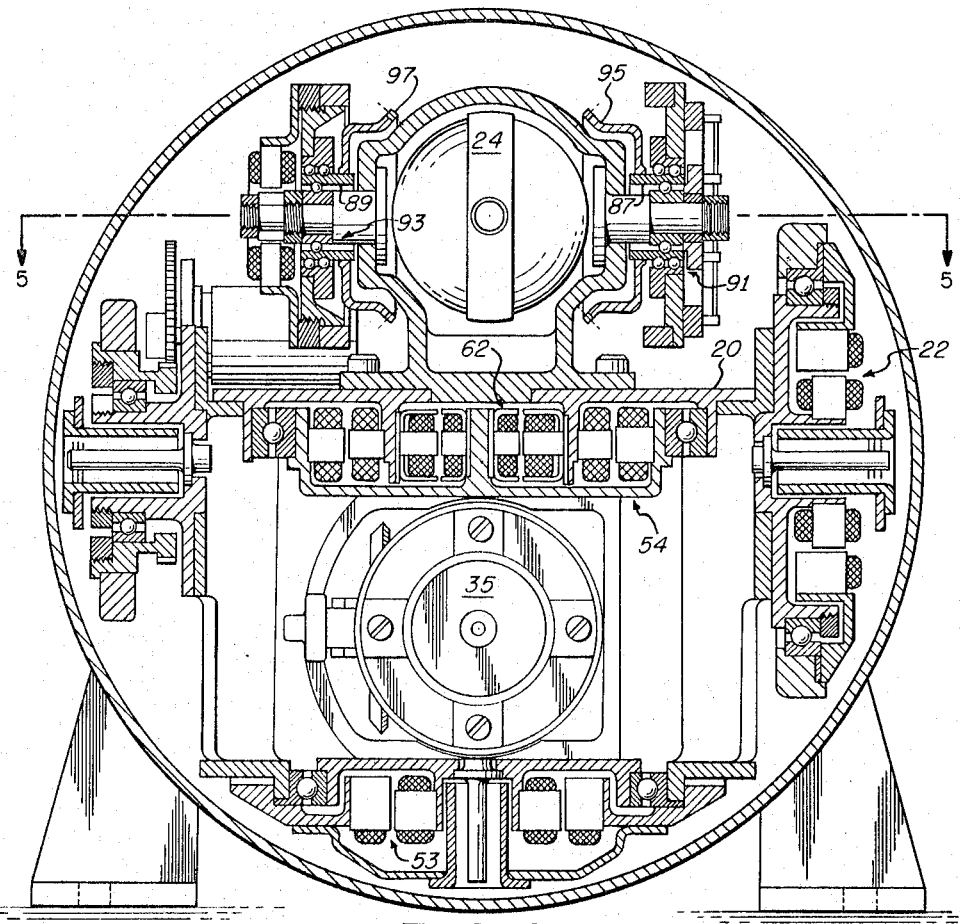
FIG. 4 is a sectional view taken along lines 4—4 of FIG. 2.
Figure 5:
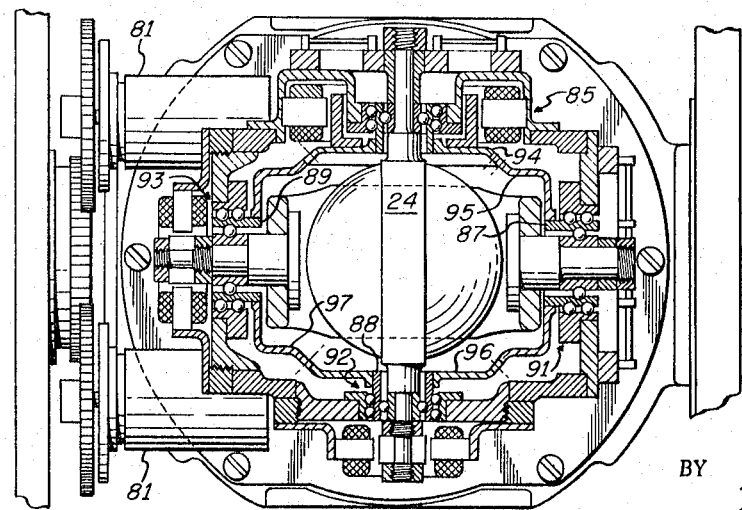
FIG. 5 is a sectional view taken along lines 5—5 of FIG. 4.

One of the important features in reducing the drift of both gyroscopes 24 and 35 resulting from unwanted torques, is the use of the principle described in U.S. Patent 2,970,480, of E. L. Ziegler et al., entitled "Anti-Friction Support Mechanism for Gyroscopic Device," issued February 7, 1961. As shown in FIGS. 3 to 5, each gimbal is supported by compound bearings each having an outer race, a middle race and an inner race. Rotating the middle race at one end of a gimbal produces torques on that gimbal by rotating the middle race at the other end of the same gimbal in an opposite direction, torques are created which counteract those produced by the rotation of the middle race of the first bearing.

Periodic reversal of the rotation of the middle race of both bearings averages the residual torques and produces a very low net torque on the gyro, thereby resulting in a correspondingly low drift rate, which theory and structure are more fully described in said U.S. Patent 2,970,480.

With respect to the vertical gyroscopes 24, a bearing drive motor 85 drives the middle races 86, 87, 88, and 89 of the respective compound bearings 90, 91, 92 and 93 by means of bevel gears 94, 95, 96 and 97, in the manner described above. With respect to the azimuth gyroscopes 35, a bearing drive motor 100 drives the middle races 101 and 102 of the respective compound bearings 103 and 104 by means of bevel gears 105, 106 and 107.

Figure 2:
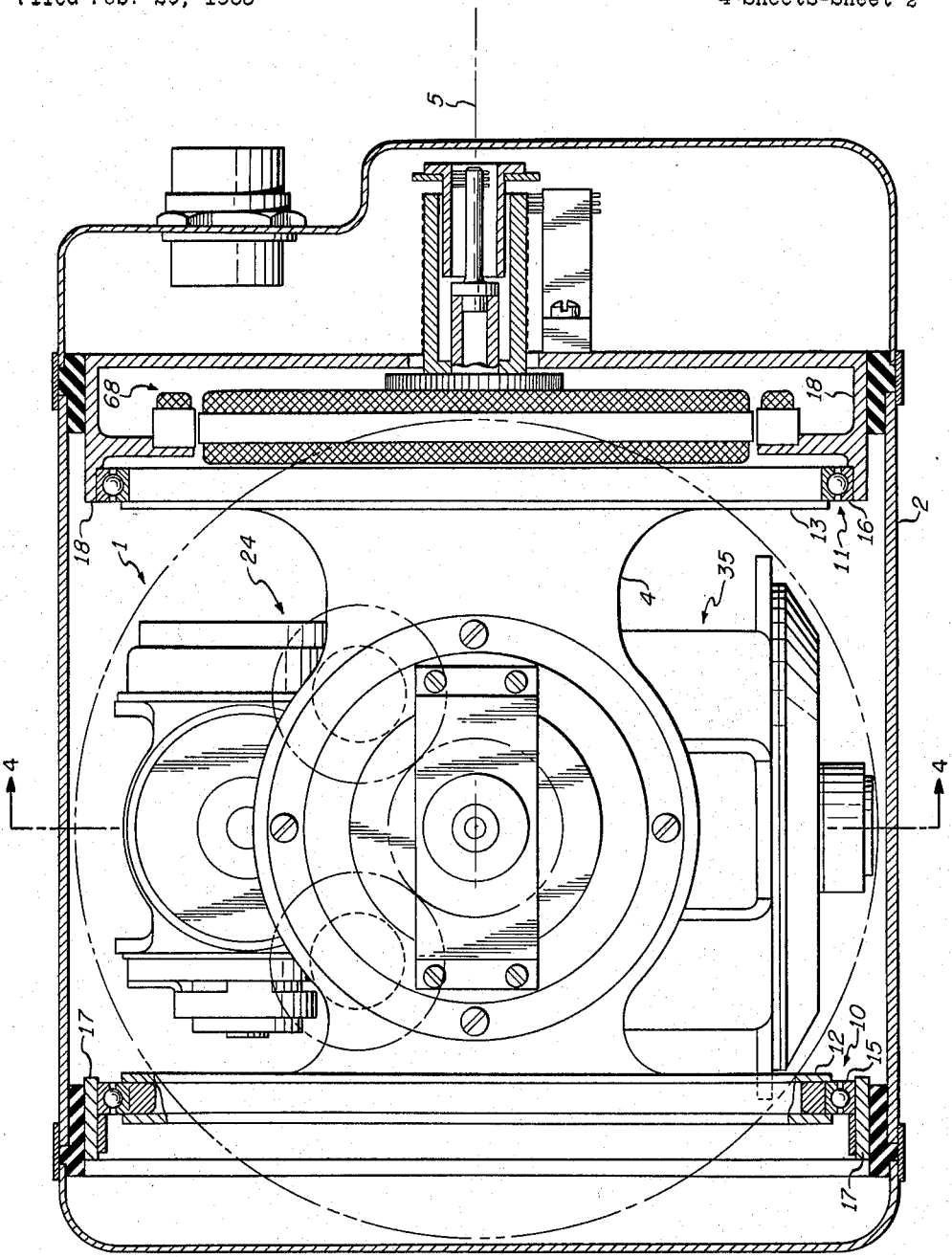
FIG. 2 is an elevation view partly in section of an actual gyroscopic stable reference apparatus utilizing two gyroscopes.

The overall length of the apparatus 1 in the direction of the axis 5 is made appreciably smaller by means of the large annular roll bearings 10 and 11 shown clearly in FIG. 2, which permit a portion of the apparatus to swing through the opening in the annular roll bearings 10 and 11 at high pitch angles as indicated on the dotted lines. The overall height of the apparatus 1 in the direction of the axis 40 is made smaller by mounting the vertical gyroscope 24 with its pitch gimbal 25 journalled on the outer pitch gimbal 20 inboard rather than outboard as is conventionally done.

It will be noted that the outer pitch gimbal 20 is a particularly rugged and strong structural member and its transverse portion is designed to support the gyroscopes 24 and 35 in a manner that minimizes the undesirable effects of accelerations acting upon the apparatus 1.

It will be appreciated that correction signals in addition to those described above may also be applied in a conventional manner depending upon the application for which the gyroscopic apparatus is intended, in a manner well known to those skilled in the art.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A three axis gyroscopic stable reference apparatus for navigable craft comprising,
   (1) a first gimbal pivotably supported on said craft for movement about the roll axis of said craft,
   (2) a second gimbal pivotably supported on said first gimbal for movement about the pitch axis of said craft,
   (3) a pair of gyroscopes pivotably mounted on said second gimbal,
   (4) pick-off means connected to said pair of gyroscopes for providing attitude information with respect to said craft about three mutually perpendicular references axes,
   (5) at least one of said gyroscopes of said pair being a two degree of freedom gyroscope,
   (6) an element pivotably mounted on said second gimbal,
   (7) means coupled to said element for stabilizing said element in azimuth,
   (8) and means including a pair of acceleration responsive means mounted on said element and having their sensitive axes orthogonally disposed with respect to each other in a normally horizontal plane for providing signals representative of the tilt of said azimuth stabilized element in horizontal, mutually orthogonal directions respectively for stabilizing said first and second gimbals in roll and pitch respectively.

2. Apparatus of the character described in claim 1 in which at least one of said gyroscopes is rotatably supported around at least one of its axes by means of spaced compound bearings each having an outer race, a middle race, and an inner race, and means connected to said middle races for rotating said middle races in opposite directions with respect to each other and periodically reversing the direction of rotation thereof.

3. Apparatus of the character described in claim 1 in which at least one of the gyroscopes of said pair is a single degree of freedom gyroscope mounted on said azimuth stabilized element for providing directional gyroscope information.

4. Apparatus of the character described in claim 1 in which said two degree of freedom gyroscope is mounted directly on said second gimbal, and the other gyroscope is a single degree of freedom gyroscope mounted on said azimuth stabilized element for providing azimuthal reference information.

5. Apparatus of the character described in claim 1 in which said two degree of freedom gyro is a vertical gyroscope having a rotor and a pitch gimbal, said second gimbal being disposed between said rotor and said pitch gimbal, and said pitch gimbal being journalled to said second gimbal.

6. Apparatus of the character described in claim 1 in which said first gimbal is pivotably supported about said craft roll axis by means of first and second spaced circumferential roll bearings at least one of said roll bearings being annular.

7. A three axis gyroscopic stable reference apparatus for navigable craft comprising,
   (1) a first gimbal pivotably supported on said craft for movement about the roll axis of said craft,
   (2) a second gimbal pivotably supported on said first gimbal for movement about the pitch axis of said craft,
   (3) a two degree of freedom gyroscope pivotably mounted on said second gimbal,
   (4) an element pivotably mounted on said second gimbal,
   (5) means coupled to said element for stabilizing said element in azimuth,
   (6) a single degree of freedom gyroscope mounted on said azimuth stabilized element whereby directional gyroscopic properties are imparted thereto for providing an azimuthal signal,
   (7) pick-off means connected to said single degree of freedom and two degree of freedom gyroscopes for providing in combination attitude information with respect to said craft about three mutually perpendicular axes,
   (8) means including first and second acceleration responsive means mounted on said element with their sensitive axes orthogonally disposed with respect to each other in a normally horizontal plane for providing signals representative of the tilt of said stabilized element in mutually orthogonal directions respectively for stabilizing said first and second gimbals in roll and pitch respectively,
   (9) each of said gyroscopes being rotatably supported around at least one of its axis by means of spaced compound bearings each having an outer race, a middle race and an inner race,
   (10) and means connected to said middle races for rotating said middle races of a cooperative pair in opposite directions with respect to each other and periodically reversing the direction of rotation of each middle race.

8. Apparatus of the character described in claim 7 in which said second gimbal includes a structurally strong central member to which said gyroscopes are positionably secured on opposite sides thereof.

9. Apparatus of the character described in claim 7 in which said two degree of freedom gyroscope has an innermost gimbal pivotably mounted for rotation about the roll axis of said craft.

10. In a gyroscopic apparatus, for navigable craft, the combination consisting of (1) a first gimbal pivotably supported on said craft for movement about an axis of said craft,
(2) second gimbal pivotably supported on said first gimbal for movement about a second axis of said craft perpendicular to said first axis,
(3) a gyroscope rotatably supported on said second gimbal,
(4) first and second spaced circumferential bearings for pivotably mounting said first gimbal about said first axis and at least one of said circumferential bearings being annular for ease of maintenance.

11. The combination recited in claim 10 in which the opening in said annular bearing is sufficiently large to permit said second gimbal to project partially therethrough during pivotal rotation thereof.

References Cited by the Examiner
UNITED STATES PATENTS

| | | | |
|---|---|---|---|
| 2,729,108 | 1/1956 | Vacquier et al. | 74—5.34 |
| 2,936,627 | 5/1960 | Wing et al. | 74—5.34 |
| 3,069,912 | 12/1962 | Faux et al. | 74—5.34 |

FRED C. MATTERN, JR., *Primary Examiner.*

MILTON KAUFMAN, BROUGHTON G. DURHAM, *Examiners.*

P. W. SULLIVAN, *Assistant Examiner.*